United States Patent
Chino et al.

(10) Patent No.: US 10,457,794 B2
(45) Date of Patent: Oct. 29, 2019

(54) RUBBER COMPOSITION CONTAINING NATURAL RUBBER AND PROCESS FOR STABILIZING VISCOSITY AND SUPPRESSING ODORS IN NATURAL RUBBER

(71) Applicant: The Yokohama Rubber Co., LTD., Tokyo (JP)

(72) Inventors: Keisuke Chino, Suratthani Province (TH); Yoshihiro Goto, Hiratsuka (JP); Jetsuda Tongsurm, Suratthani Province (TH); Duangruthai Srinun, Suratthani Province (TH)

(73) Assignee: The Yokohama Rubber Co., LTD. (JP)

( * ) Notice: Subject to any disclaimer, the term of this patent is extended or adjusted under 35 U.S.C. 154(b) by 297 days.

(21) Appl. No.: 15/106,252

(22) PCT Filed: Dec. 11, 2014

(86) PCT No.: PCT/JP2014/082854
§ 371 (c)(1),
(2) Date: Jun. 17, 2016

(87) PCT Pub. No.: WO2015/093391
PCT Pub. Date: Jun. 25, 2015

(65) Prior Publication Data
US 2018/0194929 A1    Jul. 12, 2018

(30) Foreign Application Priority Data

Dec. 19, 2013    (JP) .................... 2013-262017

(51) Int. Cl.
C08K 5/09    (2006.01)
C08K 5/31    (2006.01)
C08J 3/20    (2006.01)

(52) U.S. Cl.
CPC ............ *C08K 5/31* (2013.01); *C08J 3/203* (2013.01); *C08K 5/09* (2013.01); *C08J 2307/00* (2013.01)

(58) Field of Classification Search
CPC .... C08K 5/31; C08K 5/09; C08J 3/203; C08J 2307/00
See application file for complete search history.

(56) References Cited

U.S. PATENT DOCUMENTS

| 4,828,652 A | 5/1989 | Schropp |
| 5,788,915 A | 8/1998 | Blount |
| 5,854,309 A | 12/1998 | Blount |
| 6,258,298 B1 | 7/2001 | Blount |
| 6,270,694 B1 | 8/2001 | Blount |
| 6,380,288 B1 | 4/2002 | Hojo et al. |
| 6,515,055 B1 | 2/2003 | Nohara et al. |
| 2003/0134947 A1 | 7/2003 | Nohara et al. |
| 2013/0066021 A1* | 3/2013 | Ichikawa .............. B60C 1/0016 525/333.1 |
| 2013/0105745 A1 | 5/2013 | Xalter et al. |

FOREIGN PATENT DOCUMENTS

| JP | S63-027531 | 2/1988 |
| JP | S63-145250 | 6/1988 |
| JP | H01-0139649 | 6/1989 |
| JP | H04-046966 | 2/1992 |
| JP | H06-0256570 | 9/1994 |
| JP | 2001-139728 | 5/2001 |
| JP | 2002-053838 | 2/2002 |
| JP | 2002-226636 | 8/2002 |
| JP | 2006-084237 | 3/2006 |
| JP | 2006-176593 | 7/2006 |
| JP | 2006-213754 | 8/2006 |
| JP | 2007-204686 | 8/2007 |
| JP | 2007-204892 | 8/2007 |
| JP | 2007-238902 | 9/2007 |
| JP | 2008-143972 | 6/2008 |
| JP | 2008-210796 | 9/2008 |
| JP | 2008-274040 | 11/2008 |
| JP | 2009-215440 | 9/2009 |
| JP | 2010-173343 | 8/2010 |
| JP | 2010248334 A * | 11/2010 |
| JP | 2013-525595 | 6/2013 |
| JP | 2013-249411 | 12/2013 |
| WO | WO 1998/44040 | 10/1998 |
| WO | WO 2011/138410 | 11/2011 |

OTHER PUBLICATIONS http://www.tis-gdv.de/tis_e/ware/kautschuk/naturkautschuk/naturkautschuk.htm Transport Information Services article "Natural Rubber" Version 1.0.0.05 (Year: 2002).*
Kambara Zhou, Environment and Rubber Industry, Japan Rubber Association Journal, Publication Date Mar. 5, 2013, vol. 49 (1976) No. 2 p. 60-64, Japan.
International Search Report for International Application No. PCT/JP2014/082854 dated Mar. 24, 2015, 4 pages, Japan.

* cited by examiner

*Primary Examiner* — Peter D. Mulcahy
(74) *Attorney, Agent, or Firm* — Thorpe North & Western

(57) ABSTRACT

The present technology provides a rubber composition comprising natural rubber, which achieves the stabilization of viscosity over a long period of time and has a dramatically reduced odor by compounding an aminoguanidine into natural rubber.

9 Claims, No Drawings

RUBBER COMPOSITION CONTAINING NATURAL RUBBER AND PROCESS FOR STABILIZING VISCOSITY AND SUPPRESSING ODORS IN NATURAL RUBBER

TECHNICAL FIELD

The present technology relates to a rubber composition comprising natural rubber, which achieves the stabilization of viscosity over a long period of time and has a dramatically reduced odor, and a method for stabilizing viscosity and suppressing odors in natural rubber.

BACKGROUND ART

Natural rubber is typically produced in tropical countries such as Thailand, Malaysia, and Indonesia. Although natural rubber exhibits low viscosity immediately after the production thereof, a phenomenon called storage hardening, whereby the viscosity of the natural rubber increases (gelification), occurs due to storage, shipping, or the like after a period of approximately one month has passed.

In order to solve this problem, Japanese Patent Publication H6-256570A discloses technology which attempts to suppress increases in the viscosity of natural rubber by adding a hydrazide compound to the natural rubber. However, there is still room for improvement in the viscosity-stabilizing effect in this technology. In particular, there is a problem in that the persistence of the viscosity-stabilizing effect over a long period of time is poor. In addition, hydrazide compounds are self-decomposable, and decomposition progresses unless the compounds are prepared as aqueous solutions, which makes it impossible to store the compounds stably. Hydrazide compounds also have a unique odor and give off a foul odor when mixed.

On the other hand, since the raw materials of natural rubber are natural products, there is also a problem in that natural rubber gives off a unique foul odor due to putrefaction or the like during storage or during the production process. This odor diminishes the operating environment in the factory, and the effects on the vicinity of the factory are also problematic. Furthermore, even among manufacturers of rubber products using natural rubber, a foul odor is also generated at the time of processing—in particular, the mastication step—of the acquired natural rubber. Due to urbanization in the vicinities of factories in recent years, there has been immense investment in the installation of deodorization facilities or the like as a countermeasure to this odor, and there has been an earnest demand to make natural rubber odorless.

SUMMARY

The present technology provides a rubber composition comprising natural rubber, which achieves the stabilization of viscosity over a long period of time and has a dramatically reduced odor, and a method for stabilizing viscosity and suppressing odors in natural rubber.

As a result after conducting diligent research, the present inventors discovered the present technology by compounding an aminoguanidine compound in a natural rubber as a viscosity stabilizer and an odor inhibitor.

Specifically, the present technology is as follows.

1. A rubber composition comprising natural rubber and an aminoguanidine compound.

2. The rubber composition according to 1 above, wherein a compounded amount of the aminoguanidine compound is not less than 0.01 parts by mass per 100 parts by mass of the natural rubber.

3. The rubber composition according to 2 above, wherein a compounded amount of the aminoguanidine compound is from 0.05 to 3.0 parts by mass per 100 parts by mass of the natural rubber.

4. The rubber composition according to 1 above, wherein the aminoguanidine compound is a bicarbonate or hydrochloride of aminoguanidine.

5. A method for stabilizing viscosity and suppressing odor in natural rubber comprising a step of mixing at least natural rubber and an aminoguanidine compound.

6. The method for stabilizing viscosity and suppressing odor in natural rubber according to 5 above, wherein the method has a step of bringing natural rubber and a citric acid aqueous solution into contact prior to the step of mixing natural rubber and an aminoguanidine compound.

7. The method for stabilizing viscosity and suppressing odor in natural rubber according to 6 above, wherein a particle size of the natural rubber when bringing the natural rubber and the citric acid aqueous solution into contact is from 100 mm to 1 mm.

8. The method for stabilizing viscosity and suppressing odor in natural rubber according to 6 above, wherein a citric acid concentration of the citric acid aqueous solution is from 0.1 to 30 mass %.

9. The method for stabilizing viscosity and suppressing odor in natural rubber according to 6 above, wherein the method has a step of bringing natural rubber and a sodium pyrosulfite aqueous solution into contact prior to the step of bringing natural rubber and a citric acid aqueous solution into contact.

10. The method for stabilizing viscosity and suppressing odor in natural rubber according to 9 above, wherein a sodium pyrosulfite concentration of the sodium pyrosulfite aqueous solution is from 0.01 to 30 mass %.

11. The method for stabilizing viscosity and suppressing odor in natural rubber according to 5 above, wherein a mixed amount of the aminoguanidine compound is not less than 0.01 parts by mass per 100 parts by mass of the natural rubber.

12. The method for stabilizing viscosity and suppressing odor in natural rubber according to 11 above, wherein a mixed amount of the aminoguanidine compound is from 0.05 to 3.0 parts by mass per 100 parts by mass of the natural rubber.

13. The method for stabilizing viscosity and suppressing odor in natural rubber according to 5 above, wherein the aminoguanidine compound is a bicarbonate or hydrochloride of aminoguanidine.

14. A natural rubber obtained by the method described in 5 above.

It was ascertained through the research of the present inventors that the storage hardening of natural rubber is caused by crosslink due to reactions of aldehyde groups or the like generated in isoprene chains by oxidation reactions during the drying process.

When a typical nucleophilic agent such as an amine compound is reacted in order to capture aldehydes, there is reverse reaction in the equilibrium reaction, and aldehydes cannot be captured completely. Therefore, it is not possible to suppress crosslinking due to aldehydes, which induces an increase in viscosity. In contrast, when an aminoguanidine compound is used, there is no return such as that described above, and aldehydes can be captured completely, so it is possible to suppress increases in viscosity due to the cross-linking of aldehydes.

On the other hand, the foul odor components volatilized from natural rubber are aldehydes, fatty acids, or the like, and aldehydes and fatty acids are captured by the aminoguanidine compound due to the mechanism described above, which yields a reduction in odor.

Accordingly, with the present technology, it is possible to solve the problem of storage hardening and to provide a rubber composition comprising natural rubber, which achieves the stabilization of viscosity over a long period of time and has a dramatically reduced odor, and a method for stabilizing viscosity and suppressing odors in natural rubber.

DETAILED DESCRIPTION

The present technology is explained in further detail below.

As described above, the rubber composition of the present technology contains natural rubber and an aminoguanidine compound. The rubber composition of the present technology is preferably prepared by a process such as that described below.

Natural rubber is produced by coagulating rubber sap (natural rubber latex) collected by tapping in a rubber plantation and subjecting the product to cutting, washing, dehydration, drying, formation, and the like.

The coagulation product of the natural rubber latex is not particularly limited, and examples thereof include an unsmoked sheet (sheet prepared by coagulating latex with acid, forming the product into a sheet, and then drying), a smoked sheet (product prepared by smoking an unsmoked sheet), a cup lump (product generated by the natural coagulation of latex in a cup), a slab, or a mixed product thereof.

After these coagulation products are roughly cut about once or twice prior to being subjected to the cutting step described below, the coagulation products are preferably brought into contact with a sodium pyrosulfite aqueous solution for the purpose of preservation. This operation induces an increase in Po (Wallace plasticity) and plasticity retention index (PRI) and suppresses increases in viscosity over time. In this embodiment, the concentration of sodium pyrosulfite in the aqueous solution is, for example, from 0.01 to 30 mass % and is preferably from 0.05 to 10 mass %. Examples of contact method for the substances include a method of dispersing or a method of immersing an aqueous solution of sodium pyrosulfite in a cut coagulation product. The immersion time is preferably not less than 10 minutes. The product is typically stored in a roofed outdoor warehouse called a cup lump pool in this state for approximately 3 days to 1 month.

The coagulation product of the natural rubber latex is then repeatedly cut, washed, and formed into a sheet so as to ultimately form a small grain-shaped cutting (crumb). The particle size of the crumb is not greater than 10 mm and preferably a size of from 2 to 5 mm from the perspective of the ease of hot air drying.

In a preferred embodiment of the present technology, it is preferable to sprinkle citric acid or a solution thereof at the time of sheet formation by means of clapper treatment. An aqueous solution is particularly preferable. As a result of this process, sheet formation becomes easy, and metal ions which accelerate the degradation of the natural rubber are simultaneously removed, which has the effect of improving the plasticity retention index (PRI) and suppressing increases in viscosity over time. Another method is a method of immersing the cutting in a citric acid aqueous solution in the cutting or washing step. The particle size of the cutting when brought into contact with the citric acid aqueous solution is, for example, not greater than 200 mm and is preferably from 100 mm to 1 mm from the perspective of enhancing the effect of the present technology. The particle size of the cutting can be adjusted by combining sheet formation with a known slab cutter, a rotary cutter, or clapper treatment and cutting by means of shredder treatment multiple times.

From the perspective of improving the PRI enhancing effect, the citric acid concentration in the citric acid aqueous solution is, for example, not less than 0.01 mass % and more preferably from 0.1 to 30 mass %, and the contact time of the cutting and the citric acid aqueous solution is, for example, not less than 20 minutes and more preferably from 20 minutes to 60 minutes.

After the completion of contact with the citric acid aqueous solution, the cutting is preferably further subjected to each of the steps of sheet formation by means of clapper treatment, washing, and pulverization (crumbling) by means of shredder treatment and is then subjected to a drying step.

The drying temperature in the drying step is, for example, in a range of from 75° C. to 140° C. When the drying temperature is lower than 75° C., the water used for water washing is difficult to evaporate. Conversely, when the drying temperature exceeds 140° C., there is a risk of inducing the degradation of the physical properties of the natural rubber, which is not preferable.

The drying time is, for example, from 100 to 400 minutes.

According to the present technology, an aminoguanidine compound is added to the natural rubber before or after the drying step. Examples of aminoguanidine compounds include aminoguanidine and bicarbonates or hydrochlorides of aminoguanidine. Of these, bicarbonates or hydrochlorides of aminoguanidine are preferable. The added amount of the aminoguanidine compound is, for example, not less than 0.01 parts by mass and is preferably from 0.05 to 3.0 parts by mass per 100 parts by mass of the natural rubber. An example of an addition method is a method of kneading a powder of an aminoguanidine compound or a solution (aqueous solution) thereof into the natural rubber with a kneader such as an extruder. A method of adding the compound to the natural rubber before the drying step may also be used. When an aqueous solution of an aminoguanidine compound—for example, an alkaline aqueous solution—is used, the concentration of the aminoguanidine compound is, for example, preferably from approximately 10 to 60 mass %. A 15% aqueous solution of sodium hydroxide or the like is used as the dissolving alkaline aqueous solution.

The natural rubber of the present technology obtained in this way achieves stabilization of viscosity over a long period of time and dramatically reduced odor. As a result, the mastication step of the natural rubber can be eliminated, and the generation of a foul odor is suppressed. Odors originating from the natural rubber are also reduced in various rubber production steps after the mastication step.

The natural rubber of the present technology may contain fillers such as carbon black or silica, vulcanization agents or crosslinking agents, vulcanization agents or crosslinking accelerators, various oils, antioxidants, plasticizers, vulcanization aids, processing aids, or the like and may be suitably used as the raw material for various rubber products such as a rubber composition for a tire, for example.

EXAMPLES

The present technology is further explained in detail with reference to the working examples and comparative examples described hereinafter, but the present technology is not limited by these examples.

Working Examples 1 to 17 and Comparative Examples 1 and 2

Natural rubber latex collected by tapping was naturally coagulated in a cup so as to prepare a cup lump (CL). Next, the CL was cut, washed with water, repeatedly formed into a sheet with a clapper, and then cut to a diameter of approximately 10 mm.

Separately, natural rubber latex collected by tapping was coagulated with formic acid. The water-soluble non-rubber components were removed, and the rubber was then dried for approximately 1 week to 10 days so as to prepare an unsmoked sheet (USS).

Next, the CL and the USS were mixed at a mass ratio of CL:USS=1:1, cut, washed with water, and finally cut with a shredder machine to a particle size of not greater than 5 mm so as to prepare a cutting (crumb). After the obtained crumb was dried for 3 hours at 105° C. with a dryer, powders or alkaline aqueous solutions of various compounds in the amounts shown in Table 1 were added to 100 parts by mass of the natural rubber, and the components were or were not added with a biaxial roll so as to obtain each natural rubber sample. The Mooney viscosity and odor were measured for each of the obtained natural rubber samples.

The Mooney viscosity is a measurement of the viscosity of a natural rubber sample at 100° C. in accordance with JIS (Japanese Industrial Standard) K6300.

The odor is a value determined by sealing 3 g of a natural rubber sample in a polyvinyl chloride bag (4×6 inches), heating in an oven for one hour at 125° C., leaving to cool for 30 minutes, inserting a detecting tube of an odor measurement instrument into the vinyl bag, and measuring the odor. The odor is expressed as an index value with the value of Comparative Example 1 being 100. Lower numerical values indicate a lower odor.

The results are shown together in Table 1. In Table 1, phr refers to the parts by mass of various compounds added to 100 parts by mass of the natural rubber sample.

TABLE 1

| | | | Mooney Viscosity (ML1 + 4) | | | |
|---|---|---|---|---|---|---|
| | | Added amount | Day 1 | Day 7 | Day 14 | Day 20 |
| Comparative Example 1 | Control (nothing added) | — | 77.84 | 81.42 | 83.07 | 83.73 |
| Comparative Example 2 | Hydrazide propionate (50% aq) | 0.15 phr | 70.52 | 73.95 | 73.32 | 74.81 |
| Working Example 1 | Aminoguanidine bicarbonate (powder) | 0.15 phr | 78.86 | 81.45 | 83.09 | 83.04 |
| Working Example 2 | Aminoguanidine bicarbonate (powder) | 0.5 phr | 79.34 | 81.56 | 83.23 | 82.78 |
| Working Example 3 | Aminoguanidine bicarbonate (powder) | 1.0 phr | 79.14 | 81.58 | 82.99 | 81.73 |
| Working Example 4 | Aminoguanidine bicarbonate (50% NaOHaq) | 0.01 phr | 78.54 | 81.42 | 83.07 | 82.73 |
| Working Example 5 | Aminoguanidine bicarbonate (50% NaOHaq) | 0.15 phr | 76.49 | 78.86 | 77.77 | 78.57 |
| Working Example 6 | Aminoguanidine bicarbonate (50% NaOHaq) | 0.5 phr | 74.35 | 76.65 | 75.34 | 75.72 |
| Working Example 7 | Aminoguanidine bicarbonate (50% NaOHaq) | 1.0 phr | 74.55 | 74.94 | 74.00 | 74.52 |
| Working Example 8 | Aminoguanidine bicarbonate (25% NaOHaq) | 0.15 phr | 78.57 | 81.49 | 82.55 | 82.74 |
| Working Example 9 | Aminoguanidine bicarbonate (25% NaOHaq) | 0.5 phr | 75.89 | 77.56 | 77.73 | 76.96 |
| Working Example 10 | Aminoguanidine bicarbonate (25% NaOHaq) | 1.0 phr | 75.86 | 77.43 | 77.73 | 78.66 |
| Working Example 11 | Aminoguanidine hydrochloride (powder) | 1.0 phr | 79.62 | 81.83 | 82.88 | 82.56 |
| Working Example 12 | Aminoguanidine hydrochloride (50% NaOHaq) | 0.15 phr | 78.33 | 80.64 | 82.06 | 82.57 |
| Working Example 13 | Aminoguanidine hydrochloride (50% NaOHaq) | 0.5 phr | 78.38 | 82 | 82.86 | 82.59 |
| Working Example 14 | Aminoguanidine hydrochloride (50% NaOHaq) | 1.0 phr | 79.28 | 82.43 | 83.02 | 83.35 |

TABLE 1-continued

| | | | | | | |
|---|---|---|---|---|---|---|
| Working Example 15 | Aminoguanidine hydrochloride (25% NaOHaq) | 0.15 phr | 77.13 | 81.94 | 82.58 | 81.38 |
| Working Example 16 | Aminoguanidine hydrochloride (25% NaOHaq) | 0.5 phr | 79.56 | 82.29 | 82.76 | 82.86 |
| Working Example 17 | Aminoguanidine hydrochloride (25% NaOHaq) | 1.0 phr | 80.11 | 82.28 | 83.67 | 83.5 |
| Working Example 18 | Aminoguanidine bicarbonate (50% NaOHaq) | 0.15 phr | 76.98 | 78.97 | 77.87 | 78.49 |

| | | Mooney Viscosity (ML1 + 4) | | | |
|---|---|---|---|---|---|
| | | Difference between day 20 and day 1 | Difference between day 14 and day 1 | Difference between day 7 and day 1 | Odor Day 21 |
| Comparative Example 1 | Control (nothing added) | 5.89 | 5.23 | 3.58 | 100 |
| Comparative Example 2 | Hydrazide propionate (50% aq) | 4.29 | 2.8 | 3.43 | 94 |
| Working Example 1 | Aminoguanidine bicarbonate (powder) | 4.18 | 4.23 | 2.59 | 71 |
| Working Example 2 | Aminoguanidine bicarbonate (powder) | 3.44 | 3.89 | 2.22 | 65 |
| Working Example 3 | Aminoguanidine bicarbonate (powder) | 2.59 | 3.85 | 2.44 | 56 |
| Working Example 4 | Aminoguanidine bicarbonate (50% NaOHaq) | 4.19 | 4.53 | 2.88 | 90 |
| Working Example 5 | Aminoguanidine bicarbonate (50% NaOHaq) | 2.08 | 1.28 | 2.37 | 76 |
| Working Example 6 | Aminoguanidine bicarbonate (50% NaOHaq) | 1.37 | 0.99 | 2.3 | 74 |
| Working Example 7 | Aminoguanidine bicarbonate (50% NaOHaq) | −0.03 | −0.55 | 0.39 | 66 |
| Working Example 8 | Aminoguanidine bicarbonate (25% NaOHaq) | 4.17 | 3.98 | 2.92 | 93 |
| Working Example 9 | Aminoguanidine bicarbonate (25% NaOHaq) | 1.07 | 1.84 | 1.67 | 88 |
| Working Example 10 | Aminoguanidine bicarbonate (25% NaOHaq) | 2.8 | 1.87 | 1.57 | 75 |
| Working Example 11 | Aminoguanidine hydrochloride (powder) | 2.94 | 3.26 | 2.21 | 18 |
| Working Example 12 | Aminoguanidine hydrochloride (50% NaOHaq) | 4.24 | 3.73 | 2.31 | 79 |
| Working Example 13 | Aminoguanidine hydrochloride (50% NaOHaq) | 4.21 | 4.48 | 3.62 | 54 |
| Working Example 14 | Aminoguanidine hydrochloride (50% NaOHaq) | 4.07 | 3.74 | 3.15 | 43 |
| Working Example 15 | Aminoguanidine hydrochloride (25% NaOHaq) | 4.25 | 5.45 | 4.81 | 85 |
| Working Example 16 | Aminoguanidine hydrochloride (25% NaOHaq) | 3.3 | 3.2 | 2.73 | 67 |
| Working Example 17 | Aminoguanidine hydrochloride (25% NaOHaq) | 3.39 | 3.56 | 2.17 | 44 |
| Working Example 18 | Aminoguanidine bicarbonate (50% NaOHaq) | 1.51 | 0.89 | 1.99 | 65 |

Referring to the results of Comparative Example 1, the Mooney viscosity after 20 days increased by 5.89 points when using the viscosity of day 1 as a reference.

Referring to the results of Comparative Example 2, the Mooney viscosity increased by 4.29 points when 0.15 phr of a 50% aqueous solution of hydrazide propionate was added, and a certain degree of improvement can be seen in comparison to Comparative Example 1.

In contrast, referring to the results of Working Examples 1 to 10, in which powders or alkaline aqueous solutions of bicarbonates of aminoguanidine were used, increases in the Mooney viscosity after 20 days were suppressed to a greater degree than in the comparative examples, and it can be seen that a greater degree of viscosity stabilization is achieved with larger added amounts of bicarbonates of aminoguanidine. It can also be seen that the odor after 21 days is also greatly improved over the comparative examples.

Referring to the results of Working Examples 11 to 17, in which powders or alkaline aqueous solutions of hydrochlorides of aminoguanidine were used, results similar to those of Working Examples 1 to 10 were obtained. That is, increases in the Mooney viscosity after 20 days were suppressed to a greater degree than in the comparative examples, and it can be seen that a greater degree of viscosity stabilization is achieved with larger added amounts of hydrochlorides of aminoguanidine. It can also be seen that the odor after 21 days is also greatly improved over the comparative examples.

Working Example 18

In Working Example 5, the cutting was formed into a sheet shape using a scraper while sprinkling a 10% citric acid aqueous solution over the cutting so as to ultimately obtain a crumb of a size not greater than 5 mm, and the crumb was then dried. Working Example 5 was otherwise repeated so as to measure the Mooney viscosity. The Mooney viscosity is a value measured in accordance with JIS K6300. The results are shown in Table 1 above. As a result, it can be seen that Working Example 18 exhibits a smaller rate of change in viscosity than Working Example 5.

The invention claimed is:

1. A method for stabilizing viscosity and suppressing odor in natural rubber, the method comprising:
    a step of mixing at least a coagulation product of natural rubber latex and an aminoguanidine compound, and
    a step of bringing the coagulation product of natural rubber latex and a citric acid aqueous solution into contact prior to the step of mixing the coagulation product of natural rubber latex and an aminoguanidine compound,
    wherein the aminoguanidine compound is a bicarbonate or hydrochloride of aminoguanidine.

2. The method for stabilizing viscosity and suppressing odor in natural rubber according to claim 1, wherein a particle size of the coagulation product of natural rubber latex when bringing the coagulation product of natural rubber latex and the citric acid aqueous solution into contact is from 100 mm to 1 mm.

3. The method for stabilizing viscosity and suppressing odor in the coagulation product of natural rubber latex according to claim 1, wherein a citric acid concentration of the citric acid aqueous solution is from 0.1 to 30 mass %.

4. The method for stabilizing viscosity and suppressing odor in the coagulation product of natural rubber latex according to claim 1, the method further comprising a step of bringing the coagulation product of natural rubber latex and a sodium pyrosulfite aqueous solution into contact prior to the step of bringing the coagulation product of the natural rubber latex and a citric acid aqueous solution into contact.

5. The method for stabilizing viscosity and suppressing odor in natural rubber according to claim 4, wherein a sodium pyrosulfite concentration of the sodium pyrosulfite aqueous solution is from 0.01 to 30 mass %.

6. The method for stabilizing viscosity and suppressing odor in natural rubber according to claim 1, wherein a mixed amount of the aminoguanidine compound is not less than 0.01 parts by mass per 100 parts by mass of the coagulation product of the natural rubber latex.

7. The method for stabilizing viscosity and suppressing odor in natural rubber according to claim 6, wherein a mixed amount of the aminoguanidine compound is from 0.05 to 3.0 parts by mass per 100 parts by mass of the coagulation product of natural rubber latex.

8. The method for stabilizing viscosity and suppressing odor in natural rubber according to claim 1, wherein the aminoguanidine compound is the bicarbonate of aminoguanidine.

9. The method for stabilizing viscosity and suppressing odor in natural rubber according to claim 6, wherein the mixed amount of the aminoguanidine compound is not greater than 3.0 parts by mass per 100 parts by mass of the coagulation product of the natural rubber latex.

* * * * *